INVENTOR.
DWIGHT M. GORDON
BY George R. Ericson
ATTORNEY

June 9, 1959
D. M. GORDON
2,890,030
SECONDARY THROTTLE CONTROL FOR MULTI-STAGE CARBURETORS
Filed Oct. 13, 1955
2 Sheets-Sheet 2
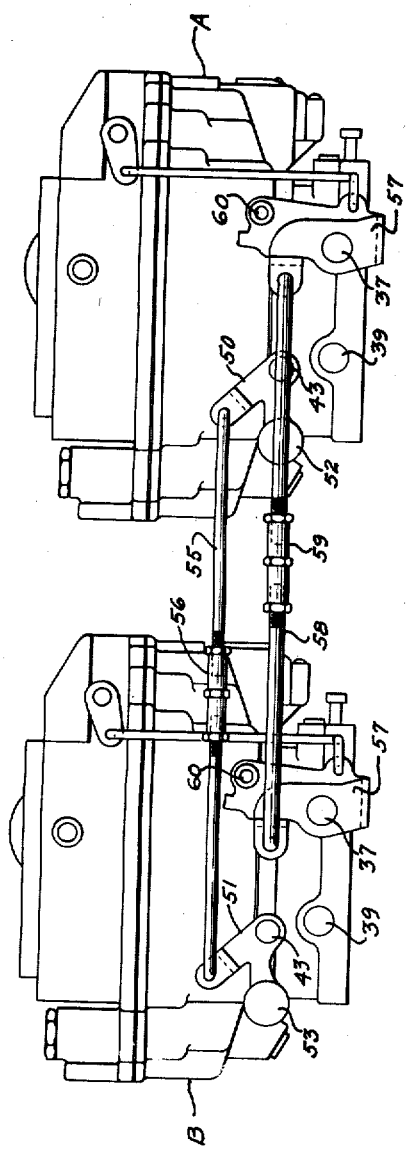
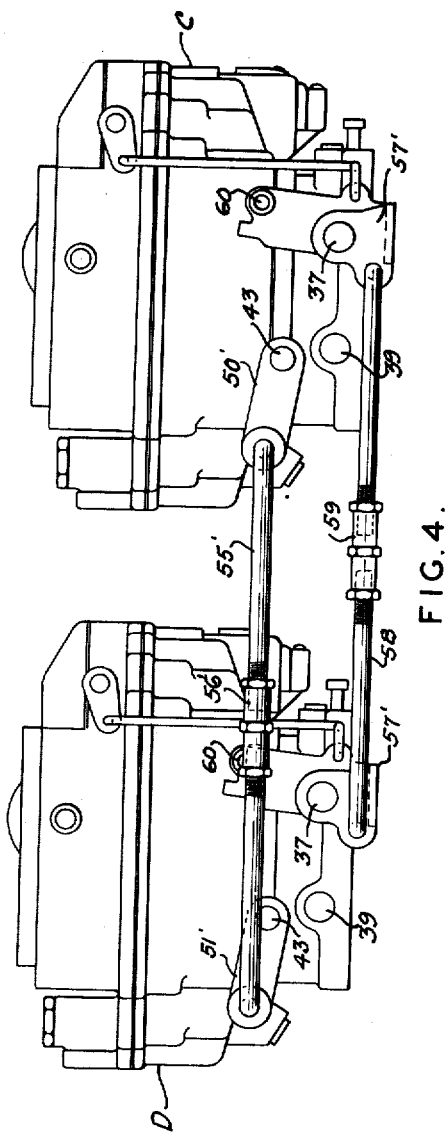
*INVENTOR.*
DWIGHT M. GORDON
BY George R. Ericson
ATTORNEY

United States Patent Office 2,890,030
Patented June 9, 1959

2,890,030
SECONDARY THROTTLE CONTROL FOR MULTI-STAGE CARBURETORS

Dwight M. Gordon, Farmington, Mich., assignor, by mesne assignments, to ACF Industries, Incorporated, New York, N.Y., a corporation of New Jersey Application October 13, 1955, Serial No. 540,281

16 Claims. (Cl. 261—23)

This invention relates to multiple carburetion for engine induction systems, and, more particularly, to means for maintaining uniform movement between the throttle valves of corresponding stages in several multi-stage carburetors.

For example, the individual carburetors may be of conventional four-barrel type, such as shown in the patent to Bicknell 2,640,472 of June 2, 1953, or Braun 2,434,192 of January 6, 1948. Both of these have throttles in the secondary stages operated automatically by suction or gas velocity, or both, developed in the induction system of the engine as a result of variations in engine speed and throttle opening and/or load.

It has been discovered that induction systems provided with a pair of these carburetors may not be satisfactory in operation because one of the automatic stages may open disproportionately to that of the other. This, of course, makes for bad unbalance in the distribution system within the intake manifolding of the engine. It is presumed that this unbalance is caused by the fact that the opening of one secondary in one of the carburetors robs the other of sufficient suction force or velocity to effect its operation until much higher engine speeds are attained.

According to the instant invention, in one form the throttle shafts operating each of the throttles within the secondary stage of each carburetor are interconnected by a linkage so arranged that opening movement of the throttle in one of the secondary stages in response to suction will produce an equal opening movement in the other secondary stage, regardless of the effect of suction on throttle operation in that stage.

In another form, the linkage is so adjusted that opening of both throttles in the same stage in each carburetor is prevented until sufficient suction is obtained to open both. In both forms, throttle movement in one stage in one carburetor is maintained uniform with throttle movement in the same stage of the other.

Further objects and advantages will appear from the reading of the specification in connection with the drawings, which illustrate two forms of the invention, and in which:

Fig. 3 illustrates one form of linkage between the two secondary throttles of the two carburetors.

Fig. 4 illustrates another form of the linkage between the two secondary throttles of the two carburetors.

Figure 1:
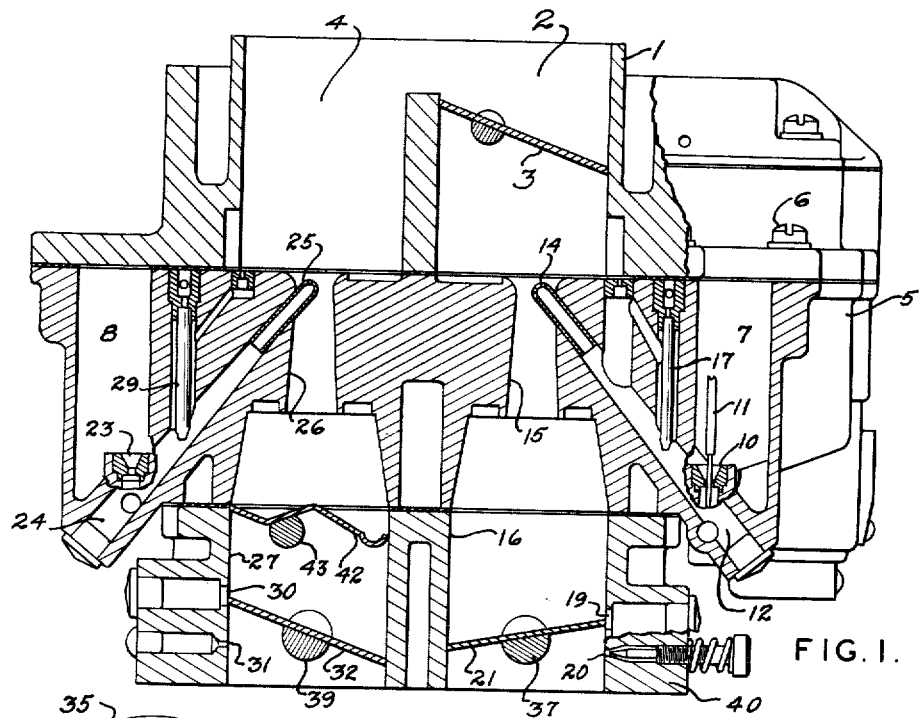
Fig. 1 is a vertical section taken through the primary and secondary stage of a four-barrel carburetor.
Figure 2:
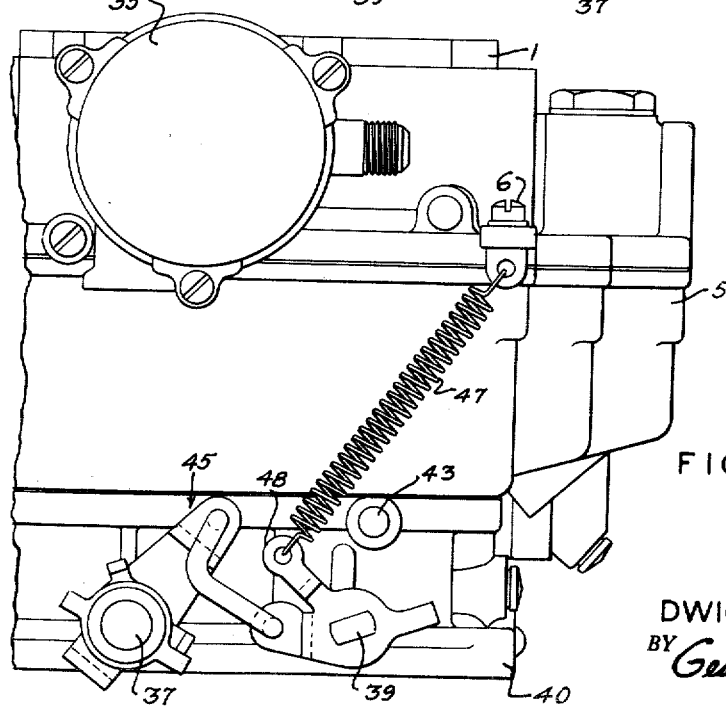
Fig. 2 is a side elevation of the same carburetor from the opposite side.

In order to facilitate an understanding of the instant invention, and the manner in which it is applied, a brief description of a four-barrel type of carburetor of one particular type is included and illustrated in Figs. 1 and 2 of the drawings, but it should be understood that the invention can be applied to coordinate the operation of the automatically operated secondary throttles in the secondary stages for any pair of carburetors.

In Fig. 1 is a carburetor having an air horn 1, within which is a passage 2 containing a choke valve 3 for controlling the air flow to two primary barrels or mixture conduits of the carburetor. Within the air horn 1 is a separate passage 4 through which the air enters the two secondary barrels of the carburetor. Air horn 1 is, in turn, secured to the body 5 of the carburetor by means of suitable screws 6, such as shown in Figs. 1 and 2. The body 5 incorporates the usual constant level fuel chambers 7 and 8, which communicate with four separate main nozzles 14 and 25, and four idle passages 17 and 29, in the primary and secondary stages. Two orifices 10, controlled by a pair of metering rods 11, control the flow of fuel to the main fuel passages 12 connecting with main fuel nozzles 14 within the primary venturi 15 in the primary mixture conduits 16. The idle system for the primary valves has a pair of idle tubes 17 which connect with suitable idle passages leading to the idle ports 19 and 20 adjacent the edge of the primary throttles 21. (This view shows only one set of each pair.)

The constant level fuel chamber 8 supplies fuel through a pair of suitable orifices 23 to main fuel passages 24 connecting with the secondary fuel nozzles 25 within the primary venturi of the secondary stages 26. These nozzles and venturi are located within each of the barrels 27 of the secondary stage. A suitable idle system supplied through idle tubes 29 and connecting with ports 30 and 31 adjacent the secondary throttles 32 may also be provided.

The choke valve 3 is controlled by a suitable mechanism such as shown in the Coffey Patent 2,085,351, located within the housing 35.

Primary throttle valves 21 are mounted on a throttle shaft 37 extending through both primary barrels of the carburetor. Throttle valves 32 in the secondary stages are mounted on a single throttle shaft 39 extending through both secondary barrels of the carburetor. Each of these throttle shafts is journaled within the throttle body generally indicated as 40, which contains a continuation of the passages 16 and 27. Passages 27 also contain automatic throttle valves 42, which are eccentrically mounted on a throttle shaft 43 extending through both secondary stage barrels 27.

As shown in Fig. 2, primary throttle shaft 37 and secondary throttle shaft 39 are drivingly interconnected by means of a lost motion linkage generally indicated as 45. This linkage is so arranged as to provide for partial opening of the primary throttles before operation of the secondary throttles, and then final movement of both to wide-open position simultaneously. The particular linkage employed is not material to the present invention, and may be that such as shown in my prior Patent 2,681,213 of June 15, 1954, and specifically illustrated in Fig. 2 thereof. A spring 47 anchored to the body of the carburetor and to arm 48 on secondary throttle shaft 39 retains the secondary throttles closed.

The opposite ends of the primary and secondary throttle shafts 37 and 39 (not shown) are preferably interconnected with one another, and with the automatic choke mechanism, in such a way as to provide for a fast idle and automatic lockout of the secondary stage throttles, all in a manner described in my aforesaid patent and illustrated therein in Figs. 1, 3 and 4.

The secondary velocity throttles 42 are so arranged within the secondary stage barrels that they have a movement of about 70 degrees from full-closed to full-open. These valves operate in a manner similar to that described for the velocity valves in the aforesaid patent to Braun.

Fig. 3 illustrates two identical carburetors A and B with both primary and secondary throttles interconnected. Each has suction and velocity operated throttles 42 as above described. The outer ends of the throttle shafts 43 have fixed thereto pairs of bell cranks 50 and 51. Each of these bell cranks carries a weight, such as 52 and 53, on one arm. Each of the other arms is provided with an eye for connection with the link 55, so that the two sets of valves will move in unison. A suitable adjustment 56 may be provided in the link so that both valves can be adjusted to be fully closed or fully open simultaneously.

The primary throttle shafts of each carburetor are provided with identical U-shaped arms 57 suitably interconnected by a link 58 with an adjustment 59, so that each primary throttle shaft may be adjusted to move in unison with the other. The arms 57 have suitable eyes 60 to which a manual control may be connected.

Operation

In the modification above described, having two identical carburetors A and B interconnected in this manner, opening movement of one pair of primary throttles 21 will produce a like operation in the other pair of primary throttles. With the automatic choke mechanism in operation, the lock-out mechanism shown in my prior patent will prevent operation of the sets of secondary throttles 32 in both carburetors. However, after the engine is fully warmed and the choke valves 3 become open, the sets of secondary throttles are unlocked, and opening movement of the primary throttles picks up the linkage between the primary throttles and the secondary throttles, and opens the sets of secondary throttles 32. If, at this time, there is sufficient suction, the throttles 42 will tend to open due to their unbalance, since they are maintained closed only by the eccentric weights 52 and 53 and the weight of link 55, which is equally divided between them.

It will be noted that the angle of the arms 50 and 51 is substantially 45 degrees to the vertical. Due to this arrangement of the link 55 and levers 50 and 51, when the suction on one of the valves 42 becomes sufficient to rotate the valve, the other valve 42 in the second carburetor will also be opened. For systems operating in this manner, the angularity of the arms 50 and 51 is important. Because of friction in the linkage, the angularity of the arms 50 and 51 to the vertical cannot be more than approximately 60 degrees or less than 30 degrees, or some toggle action will be experienced either in the fully closed position of the velocity valves, or the fully open position. This range appears to be fairly critical in the proper operation of the velocity valves as above described.

Fig. 4 illustrates two identical carburetors, C and D, with a different form of interconnecting linkage. Identical parts are indicated by the same reference character, and similar parts performing a similar function are indicated by the same reference character with a prime. The primary throttle shaft 37 of carburetor C mounts a U-shaped lever 57'. The same kind of lever is also carried by the primary throttle shaft 37 of carburetor D. These levers are innterconnected by a link 58 provided with an adjustment 59 for synchronizing the action of the primary throttle shafts. The eye 60 in lever 57' provides for connection of a manual operator.

Preferably, the secondary throttle shafts 39 in carburetors C and D are operated from the primary throttle shafts through an interconnection similar to that shown in Fig. 2 or in my prior patent above referred to. The velocity throttle shafts 43 mount a pair of levers 50' and 51' which are interconnected at their extreme ends by a link 55' provided with an adjustment 56' for synchronizing the action of the velocity throttles. The weight of the connecting link 55' makes additional weights or springs unnecessary. In this modification, the links 50' and 51' are mounted on the throttle shafts 43, so that, in the closed position of the velocity throttles 42, these arms will lie at an angle greater than 60 degrees to the vertical, and preferably around 10 or 15 degrees with the horizontal.

Operation

This modification of the invention differs from the first modification above described, due to the difference in the angularity between the levers 50' and 51' and the interconnecting link 55'. In this embodiment, the links and levers approach a near straight-line position with the velocity throttles 42 closed. Because of this angular relation, there is a distinct toggle action between the link 55' and the levers 50' and 51' which tends to lock both velocity throttles closed, because the pivots of the links and levers approach a straight-line relation. The toggle effect prevents the opening of one of the pairs of velocity throttles in one of the carburetors in response to a force tending to open the other pair of velocity throttles in the other carburetor, and, because of this link-lever relation, the suction on both pairs of velocity throttles must reach a degree tending to open both pairs before any movement is permitted of either pair. In order to obtain this effect, it is necessary in a practical setup to have the levers 50' and 51' lie at an angle greater than 70 degrees to the vertical with the velocity throttles closed. These throttles have an opening of 70 degrees, which becomes a limiting factor when the link 55' is the closing weight. The other limit of adjustment between the parts would be absolute dead center, or, with the levers 50' and 51' at 90 degrees from the vertical with the velocity throttles closed. However, as a practical matter, a satisfactory operating device cannot be obtained at this extreme point, and it is generally preferred to have the levers 50' and 51' arranged within the range of 60 to 80 degrees.

Two different embodiments of the invention have been described, one of which may be found more suitable to engine and carburetor operation than the other in a particular instance, but it is contemplated that it will be obvious to those skilled in the art that these linkages can be applied to obtain the same results in other types of multi-stage carburetor systems.

I claim:

1. A control linkage for a carburetor system including a plurality of primary barrels, a plurality of secondary barrels, manually operated throttle valves in said primary barrels, suction operated throttles in said secondary barrels, and means connected with said suction operated throttles resisting opening movement, said connecting means including levers of equal length fixed at one end to said suction operated throttles and having outer ends disposed relative to said fixed ends disposed in the same direction and at an acute angle with respect to a horizontal line through said fixed ends, and a connecting link between said outer ends.

2. A control linkage for a carburetor system including a plurality of primary barrels, a plurality of secondary barrels, manually operated throttle valves in said primary barrels, suction operated throttles in said secondary barrels, and means connected with said suction operated throttles resisting opening movement, said connecting means comprising levers fixed at one end thereof to their respective suction operated throttles, each lever having an outer end disposed relative to its fixed end in the same direction at an acute angle with respect to a vertical line extending upwardly from said fixed end, and a connecting link between said outer ends parallel to and above a line of centers through said fixed ends whereby the force on one of said throttles due to suction can open the other.

3. A control linkage for a carburetor system including a plurality of primary barrels, a plurality of secondary barrels, manually operated throttle valves in said primary barrels, suction operated throttles in said secondary barrels, and means connected with said suction operated throttles resisting opening movement, said means comprising levers fixed at one end to said suction operated throttles and having outer ends disposed relative to said fixed ends in the same direction at an angle greater than 60° with respect to a vertical line extending upwardly from said fixed end, and a connecting link between said outer ends parallel to and above a line of centers through said fixed ends whereby the force on one of said valves due to suction is inoperative to open the other.

4. A control linkage for a carburetor system including a plurality of primary barrels, a plurality of secondary barrels, manually operated throttle valves in said primary barrels, suction operated throttles in said secondary barrels, said control linkage comprising levers of equal length fixed at one end to said suction operated throttles and having outer ends disposed, relative to said fixed ends, to form opposite ends of a parallelogram linkage, and a weighted link interconnecting said free ends and providing a force resisting opening movement of said suction operated throttles.

5. In a carburetion system for an internal combustion engine having an intake manifold, a pair of carburetors for supplying fuel to said intake manifold, each carburetor comprising primary and secondary mixture conduits having primary and secondary throttles, respectively, linkage means interconnecting said primary throttles for common movement, linkage means interconnecting each primary throttle to its respective secondary throttle for sequentially operating said secondary throttles from said primary throttles, an unbalanced velocity valve in each secondary conduit anterior to its respective secondary throttle, and connecting means interconnecting said velocity valves for common movement responsive to variations in flow through their respective secondary conduits when said secondary throttles are open, said connecting means being arranged to unbalance said velocity valves in a closing direction.

6. In a carburetion system for internal combustion engines, a pair of carburetors for supplying fuel to an intake manifold, each carburetor comprising primary and secondary mixture conduits having primary and secondary throttles, respectively, linkage means interconnecting said primary throttles for common movement, linkage means interconnecting each primary throttle to its respective secondary throttle for sequential operation, an unbalanced velocity valve in each secondary conduit anterior to its respective secondary throttle, connecting means interconnecting said velocity valves for common movement responsive to variations in flow through their respective secondary conduits when said secondary throttles are open, said connecting means comprising parallel levers secured to their respective velocity valves, and a link interconnecting said levers.

7. In a carburetion system for internal combustion engines, a pair of carburetors for supplying fuel to an intake manifold, each carburetor comprising primary and secondary mixture conduits having primary and secondary throttles, respectively, linkage means interconnecting said primary throttles for common movement, linkage means interconnecting each primary throttle to its respective secondary throttle for sequential operation, an unbalanced velocity valve in each secondary conduit anterior to its respective secondary throttle, connecting means interconnecting said velocity valves for common movement responsive to variations in flow through their respective secondary conduits when said secondary throttles are open, said connecting means comprising parallel levers secured to their respective velocity valves, and a link interconnecting said levers, said levers being similar in length and normally disposed at corresponding acute angles to a plane through the axes of rotation of the velocity valves.

8. In a carburetion system for an internal combustion engine means, a plurality of carburetors for supplying fuel to induction means in said engine means, each of said carburetors having an induction conduit, valve means in each of said induction conduits for controlling the flow therethrough responsive to suction to progressively open said induction conduits, and means to simultaneously actuate said valve means in response to suction in less than all of the induction conduits in said carburetors.

9. In a carburetion system for an internal combustion engine means, a plurality of carburetors for supplying fuel to induction means in said engine means, each of said carburetors having an induction conduit, valve means in each of said induction conduits for controlling the flow therethrough responsive to suction in said induction conduits, means to simultaneously actuate said valve means in response to suction in less than all of the induction conduits in said carburetors, lever means fixed to each of said valves to move therewith, and link means interconnecting adjacent lever means.

10. A carburetor system having a plurality of induction conduits, suction operated valves in each of said conduits to control flow therethrough, control linkage means to synchronize opening and closing of said valves responsive to suction in said induction conduits, said means comprising a lever having an end fixed to each of said valves and having an outer end, connecting means on each of said outer ends of said levers, a connecting link between said connecting means of adjacent levers, said connecting means being disposed relative to said fixed ends at an acute angle with respect to a perpendicular to a line of centers between fixed ends of adjacent links.

11. A carburetor system including an induction passage having a plurality of induction conduits, suction operated valves in each of said conduits, and means connected with said suction operated valves resisting opening movement of said valves, control linkage means to synchronize opening and closing of said valves responsive to suction in said induction passage, said means comprising levers each fixed at one end to one of said suction operated valves and having an outer end, a connecting link between said outer ends of adjacent levers, said outer ends being disposed relative to said fixed ends at an acute angle with respect to a perpendicular to a line of centers between fixed ends of adjacent links.

12. In a carburetion system for an internal combustion engine means, a plurality of carburetors for supplying fuel to induction means in said engine means, each of said carburetors having an induction conduit, valve means in each of said induction conduits for controlling the flow therethrough responsive to the suction in said induction means, and means to simultaneously actuate said valve means when the suction in each of said induction conduits is at least sufficient to nearly open said valve means therein.

13. In a carburetion system for an internal combustion engine means, a plurality of carburetors for supplying fuel to induction means in said engine means, each of said carburetors having an induction conduit, valve means in each of said induction conduits for controlling the flow therethrough responsive to the suction in said induction means, means to simultaneously similarly actuate said valve means when the suction in each of said induction conduits is at least sufficient to produce initial opening of said valve means therein, lever means fixed to each of said valves to move therewith, and link means interconnecting adjacent lever means.

14. A carburetor system having a plurality of induction conduits, suction operated valves in each of said conduits to control flow therethrough, control linkage means to synchronize opening and closing of said valves responsive to suction in said induction conduits, said means comprising a lever fixed to each of said valves and each having an outer end, connecting means on each of said outer ends of said lever, a connecting link between said connecting means of adjacent levers, said connecting means and the fixed portion of each of said levers defining therebetween a line of centers substantially parallel to each other and lying between positions of general alignment and a minimum displacement therefrom defining an angle of not less than sixty degrees with a line of centers between the fixed portions of adjacent levers.

15. The carburetor system of claim 14 wherein said angle is preferably about seventy degrees.

16. A carburetor system including an induction passage having a plurality of induction conduits, suction operated valves in each of said conduits, and means connected with said suction operated valves resisting opening movement of said valves, control linkage means to synchronize opening and closing of said valves responsive to suction in said induction passage, said means comprising levers each fixed at one end to one of said suction operated valves and having an outer end, a connecting link between said outer ends of adjacent levers, said outer end and said fixed end of each of said levers defining a line of centers substantially parallel to each other and lying between positions of general alignment and a minimum displacement therefrom to define an angle of not less than sixty degrees with a line of centers between fixed portions of adjacent levers.

References Cited in the file of this patent

UNITED STATES PATENTS

| | | |
|---|---|---|
| 1,920,174 | Harris | Aug. 1, 1933 |
| 2,420,925 | Wirth | May 20, 1947 |
| 2,463,256 | Ericson | Mar. 1, 1949 |
| 2,703,229 | Henning | Mar. 1, 1955 |
| 2,725,859 | Turlay | Dec. 6, 1955 |